June 11, 1963  D. T. AYERS, JR  3,093,120
FLUID PRESSURE MOTOR MECHANISM
Filed Dec. 26, 1961  3 Sheets-Sheet 1
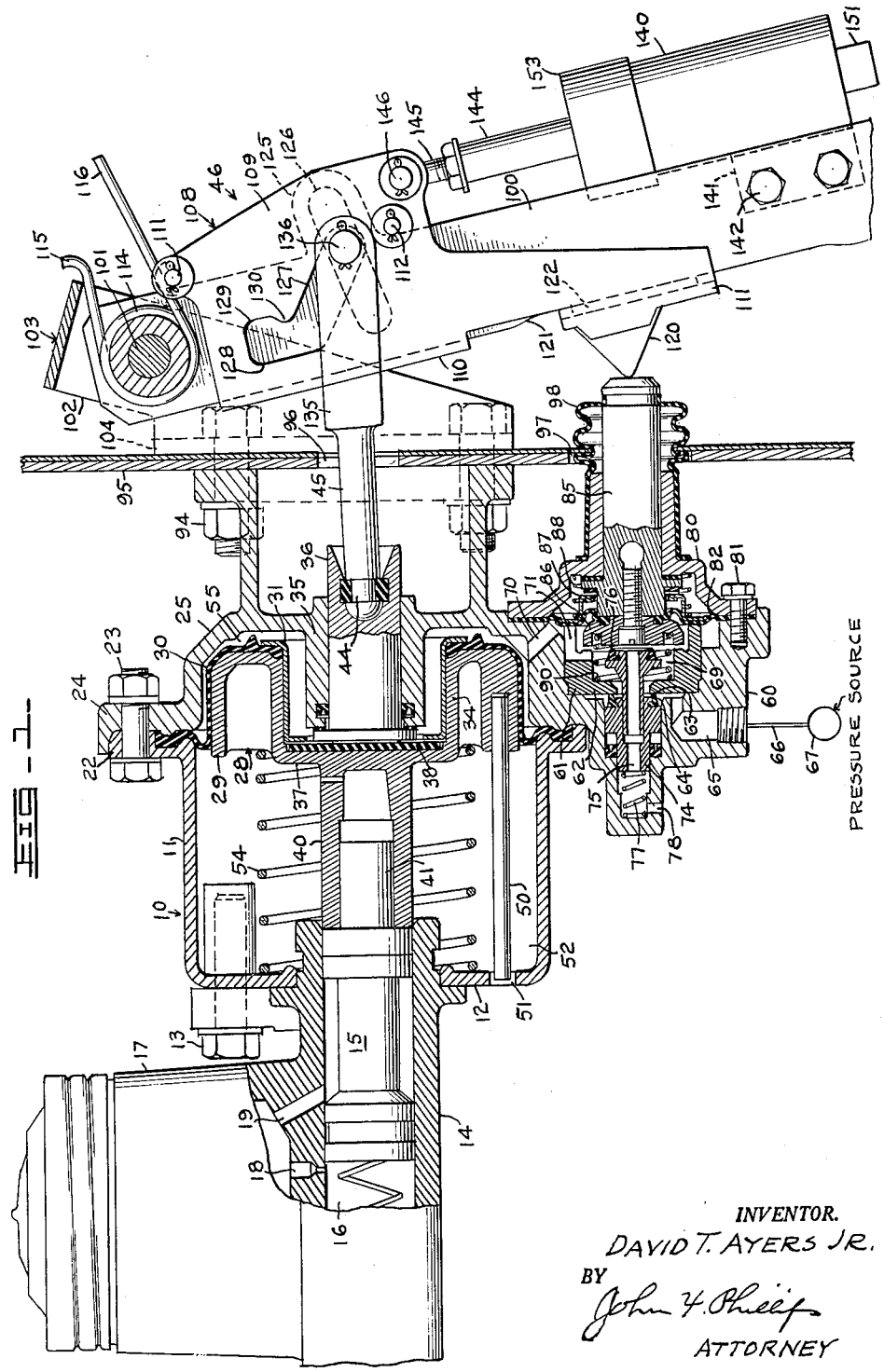
INVENTOR.
DAVID T. AYERS JR.
BY
John F. Philip
ATTORNEY

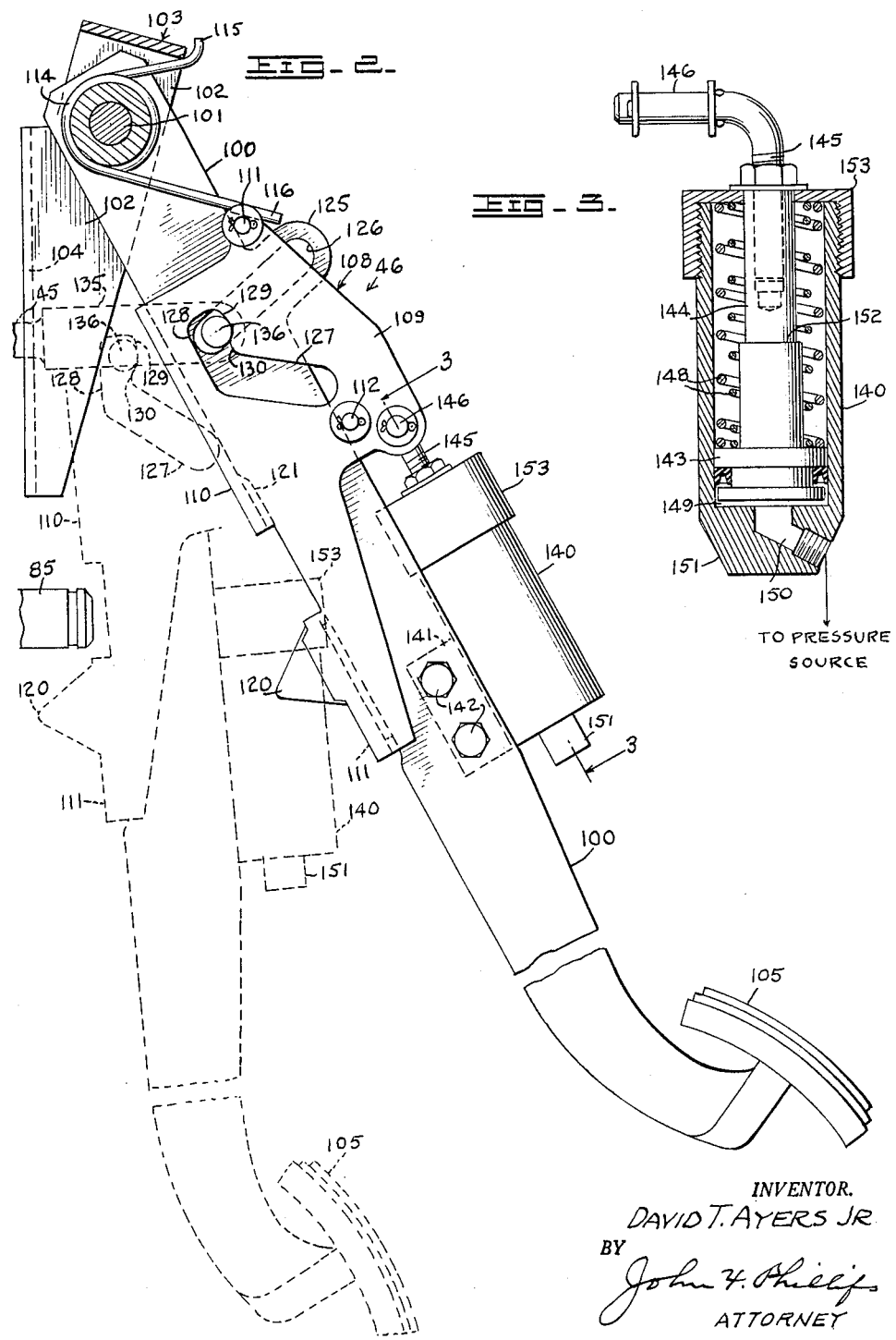

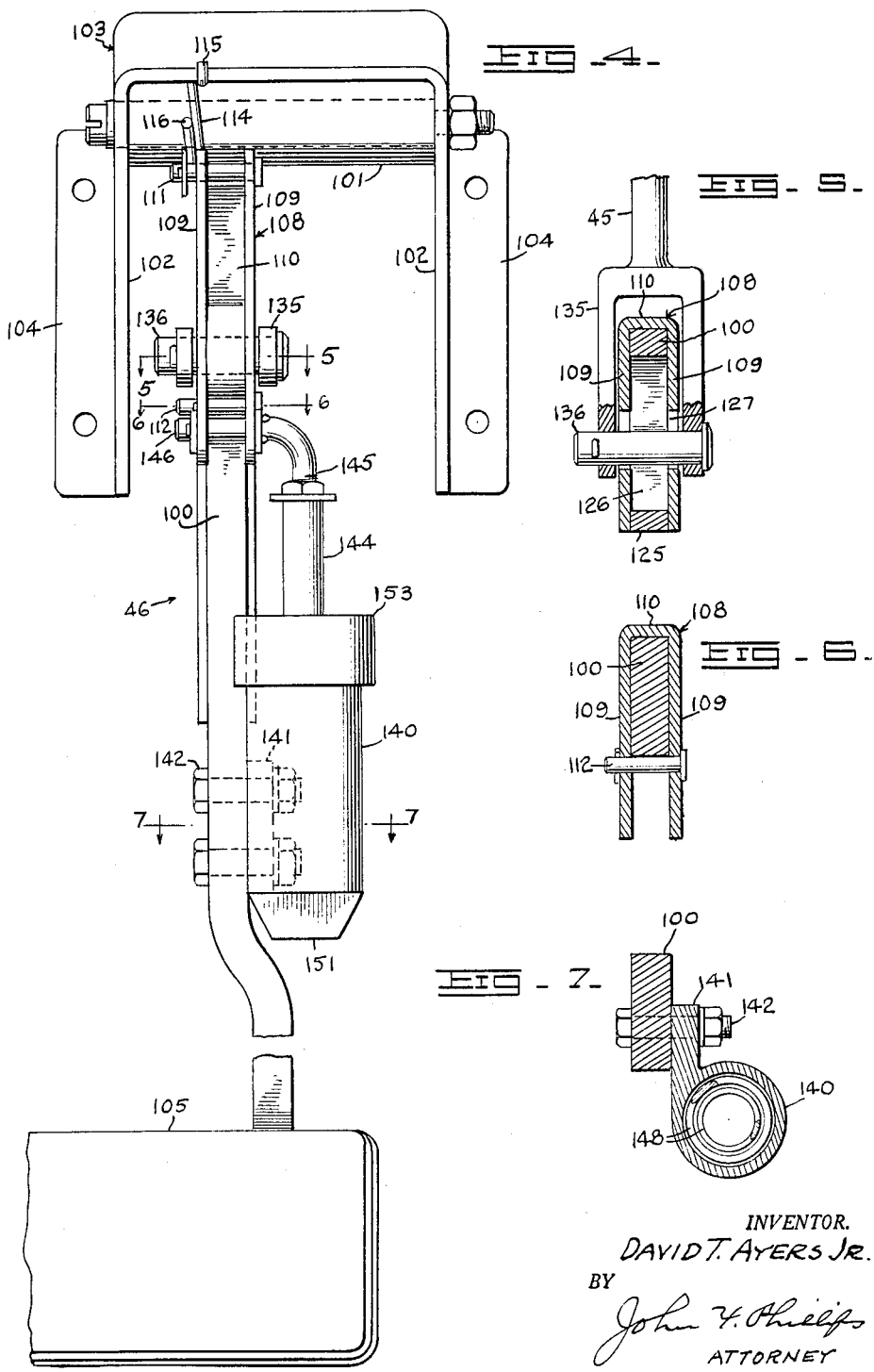

United States Patent Office 3,093,120
Patented June 11, 1963

3,093,120
FLUID PRESSURE MOTOR MECHANISM
David T. Ayers, Jr., Birmingham, Mich., assignor to Kelsey-Hayes Company, Romulus, Mich., a corporation of Delaware
Filed Dec. 26, 1961, Ser. No. 162,151
15 Claims. (Cl. 121—38)

This invention relates to a fluid pressure motor mechanism, and particularly to a mechanism adapted for operating the brakes of motor vehicles.

Power braking systems for motor vehicles, as generally employed, are booster systems wherein a fluid pressure motor performs part of the work while pedal forces applied by the operator perform the remainder of the work necessary for a given brake application. Such systems make practicable the use of depending brake pedals, the pedal pads of which may be arranged substantially lower than the pedal pads of manual braking systems. This makes the operation of the brake pedal easier, but the travel of the pedal is limited. Accordingly in the event of a failure of power in a pressure source for the motor, the limited pedal travel and the relatively low leverage available to the operator make it necessary to apply substantial foot pressures to the brake pedal to stop the vehicle.

Recent improvements in brake systems of this general type include fluid pressure motors which are not boosters, but which supply all of the force necessary for the operation of the brakes. In such systems, very short pedal travel is necessary since the operator is called upon to effect only movement of the valve mechanism for controlling the motor. It has been necessary however to provide the brake pedal with the usual travel inherent in brake pedals for booster motors in order that the operator may manually apply the brakes in the event of a failure in power.

In the copending application of Edward Govan Hill, Serial No. 157,971 filed December 8, 1961, there is disclosed a motor mechanism of the full-power type wherein the operator normally is called upon to move the brake pedal only a fraction of an inch to operate the valving for the fluid pressure motor, and wherein broad means operates in response to a failure of pressure in the source for swinging the brake pedal to a higher position and to provide a relatively higher pedal lever ratio so that upon a failure of power in the source, manual application of the brakes may be accomplished substantially in accordance with conventional pedal operation. This is accomplished by removing the motor control valve mechanism from the motor and offsetting it below the motor, a substantial distance from the pivot axis of the brake pedal, and by providing means substantially closer to the pivot axis of the pedal lever for swinging the latter to a second and higher normal position, when pressure in the source fails, and for establishing a mechanical connection, in such second normal position of the brake pedal, between the piston of the motor and the pedal lever for a manual application of the brakes.

An important object of the present invention is to provide a mechanism having the broad advantages of the mechanism of the copending application referred to but wherein the lever mechanism provides a highly efficient device carried by the pedal lever itself for moving the latter to the second and higher normal position referred to and for establishing a mechanical connection between the pedal lever and the motor piston and master cylinder plunger so as to greatly facilitate manual operation of the brakes upon a power failure.

A further object is to provide, in combination with the motor of the copending application referred to, a novel control device carried by the pedal lever, which device is normally operative for moving the valve mechanism and normally inoperative for applying force to the master cylinder plunger, and to provide novel means for moving the control device along the pedal lever to swing the latter to the higher second normal position referred to and to establish an effective mechanical connection for transmitting pedal forces to the master cylinder plunger.

A further object is to provide such a combination wherein the control member is slidable along the pedal lever upon a failure of pressure in the source and includes cam means for swinging the pedal lever to its higher second normal position, the cam means having a portion for establishing the mechanical connection necessary for transmitting direct pedal forces to the master cylinder plunger for the manual operation of the brakes.

A further object is to provide such a mechanism wherein the mechanical connection between the master cylinder and the pedal lever is established solely through the control member, and wherein the cam means normally has a lost motion connection within the limits of which the pedal lever is normally operative for controlling the valve mechanism without transmitting any forces to the master cylinder piston, but wherein the cam means, when the control member is operated to raise the pedal, has portions engageable with a force transmitting pin to transmit pedal forces from the pedal lever to the master cylinder plunger while rendering the pedal lever mechanism incapable of operating the motor valve mechanism, all of which functions occur automatically and instantly upon a failure of pressure in the source.

Other objects and advantages of the invention will become apparent during the course of the following description.

In the drawings I have shown one embodiment of the invention. In this showing

FIGURE 1 is an axial sectional view through the motor showing the connection of the motor valve mechanism to the pedal lever mechanism, a part of the latter being broken away;

FIGURE 2 is a side elevation of the pedal lever mechanism showing the pedal in solid lines in the position it will assume upon a power failure for the motor, an extreme lower position of the pedal mechanism being shown in dotted lines;

FIGURE 3 is a slightly enlarged detailed sectional view on line 3—3 of FIGURE 2;

FIGURE 4 is a rear elevation of the pedal lever mechanism and associated elements;

FIGURE 5 is a section on line 5—5 of FIGURE 4;

FIGURE 6 is a detailed sectional view on line 6—6 of FIGURE 4; and

FIGURE 7 is a similar view on line 7—7 of FIGURE 4.

Referring to FIGURE 1, the numeral 10 designates a fluid pressure motor as a whole operative in the present instance from a source of superatmospheric pressure. The motor comprises a cylindrical casing section 11 having a head 12 at one end bolted as at 13 to a conventional master cylinder 14. This master cylinder is provided therein with a conventional plunger 15 for displacing fluid from a chamber 16 to conventional vehicle brake lines (not shown). The master cylinder is provided with the usual reservoir 17 from which fluid is supplied to the master cylinder through conventional ports 18 and 19.

The other end of the cylinder 11 is provided with a flange 22 bolted as at 23 to a flange 24 formed on a head casting 25. A pressure responsive unit indicated as a whole by the numeral 28 is arranged in the motor and is provided with an outer cylindrical flange 29 around which is arranged a rolling diaphragm 30 fixed to the body of the pressure responsive unit by a clamping ring 31. The outer periphery of the diaphragm 28 is beaded to be clamped between the flanges 22 and 24.

The body of the pressure responsive unit is provided inwardly of the flange 29 with a cylindrical portion 34 into which extends a bearing hub 35 formed integral with the head 25 to slidably receive a manually operable axially movable member 36. At the left end of the cylindrical portion 34, the body of the pressure responsive unit is provided with a wall 37 in which is arranged a rubber bumper 38 engageable with the adjacent end of the manually operable member 36. The body of the pressure responsive unit is provided with an axially extending sleeve 40 receiving an axial projection 41 on the plunger 15. The pressure responsive unit has its body accordingly guided for axial movement by the plunger 15, and the end of the sleeve 40 engages the body of the plunger 15 to effect movement thereof when the motor is energized.

The manually operable member 36 is connected as at 44 with one end of a push rod 45 the other end of which is operable by a brake pedal mechanism indicated as a whole by the numeral 46 and described in detail below. In normal brake operation the manually operable member 36 remains stationary, but the left end of such member, upon a failure in power in the motor transmits movement through the bumper 38 to the sleeve 40 for the pedal operation of the master cylinder plunger 15.

It will become apparent that when power is present and the mechanism is operating normally, the pedal lever mechanism partakes of only a very slight motion to operate the valve mechanism to be described to energize the motor. Since the pedal does not partake of the usual substantial stroke, it is advisable to provide some means to indicate the progressive wearing of the brake shoes. To this end, an indicating rod 50 is fixed to the body of the pressure responsive unit 28 and projects through an opening 51 in the cylinder head 12. This opening also connects to the atmosphere the left hand chamber 52 of the motor 10. The pressure responsive unit 28 is biased to off position by a return spring 54 against which the motor piston operates to move the plunger 15 when air is admitted to the pressure chamber 55 by the valve mechanism to be described.

The head 25 is provided at the bottom thereof with a radially extended portion 60 forming a valve housing. In this housing is arranged a plug 61 having a wall 62 forming a valve seat normally engaged by a valve 63 arranged in a pressure chamber 64 communicating with a passage 65 connected by a line 66 with a source 67 of superatmospheric pressure.

The valve 63 normally prevents the flow of pressure from the source into a control chamber 69 which communicates with the motor chamber 55 through a passage 70. The surrounding wall of the plug 61 is cut away as at 71 to connect the chamber 69 to the passage 70.

The valve 63 is carried by a two-part valve body 74 having an axial passage 75 therethrough the right-hand end of which normally communicates with the chamber 69 around an annular valve 76 which is carried by the valve body 74 and is normally open. The valve body 74 and the two valves are biased to the right to their normal positions by a spring 77. The passage 75 is open to the atmosphere through a vent 78.

A cap 80 is fixed to the valve housing 60 by screws 81 which serve also to clamp in position the outer periphery of a diaphragm 82, the left-hand face of which is exposed to pressure in the chamber 69. A valve operating member 85 is slidable in the cap 80 and has fixed to its inner or left-hand end a head 86 the left-hand face of which forms a seat for the valve 76. The inner periphery of the diaphragm 82 is clamped between the members 85 and 86.

A spring seat 87 is arranged against the right-hand face of the diaphragm 82 and is biased to the left by a spring 88 which maintains the diaphragm in engagement with the adjacent shoulder of the plug 61. The spring seat 87 has limited movement to the right under the influence of pressure in the chamber 69 to engage the adjacent portion of the member 85 to transmit reaction forces to the pedal mechanism, as described below. The members 85 and 86 are biased to the right in FIGURE 1 by a spring 90.

The head 25 is bolted as at 94 to the fire wall 95 of the vehicle and this wall is provided with openings 96 and 97 through which the respective members 45 and 85 project. A rubber boot 98 is connected at one end to the manually operable member 85 and to the adjacent portion of the cap 80.

Rearwardly of the fire wall 95 is arranged the pedal lever mechanism 46 generally referred to above. This mechanism comprises a pedal lever 100 pivotly supported at its upper end by a pivot pin 101 projecting through opposite walls 102 of a substantially inverted U-shaped bracket 103, the walls 102 being flanged as at 104 for connection with the fire wall 95 by the bolts 94. The pedal lever 100 is provided at its lower end with the usual pedal pad 105. The pedal lever is shown in FIGURE 1 in the normal position it will assume when the brakes are released and pressure is present for operating the motor 10.

A control member 108 is mounted to slide longitudinally of the pedal lever 100. The control member 108 is of U-shaped cross section (FIGURE 6) thus comprising opposite walls 109 and spaced connecting portions 110 and 111 engaging the forward edge of the pedal lever 100. The opposite walls 109 of the control member are connected by guide pins 111 and 112 which engage the rear edge of the pedal lever 100. A torsion spring 114 surrounds the pivot pin 101 and has one end 115 engaging the bracket 103 and its opposite end 116 engaging the guide pin 111. The spring end 116 exerts two resultant forces against the control member 108, one of which forces tends to slide the member 108 downwardly along the pedal lever 100 and the other of which tends to swing the lever 100 and control member 108 for clockwise movement around the axis of the pivot 101. The latter action maintains in engagement with the adjacent end of the manually operable member 85 a rubber valve operating bumper 120 carried by the portion 111 of the control member 108. The portion of the pedal lever 100 to the right of the bumper 120 is preferably slightly cut back as in 121 for clearance purposes, as described below, and between such cut back portion of the pedal lever 100 and the portion 111 of the control member 108 is arranged a spacer 122.

The pedal lever 100 is provided with an extended rear edge portion 125 and in such portion of the pedal lever and in the body thereof is formed a straight angular slot 126. The control member 108 is provided in the walls 109 thereof with registering angular slots 127 the lower ends of which extend across the slot 126. The upper ends of the slots 127 have their forward edges 128 extending parallel to the forward edge of the control member 108. Such upper ends of the slots 127 are enlarged rearwardly as at 129 and such portions of the slots have at their lower ends forwardly extending curved portions 130. These slot portions form the upper slot portions 129 as a recess for a purpose to be described.

The rear end of the push rod 45 is formed as a yoke 135 the rear ends of the arms of which are connected by a cross pin 136 extending through the slots 126 and 127. The pin 136 has clearance in the lower ends of the slots 127 within the limits of which the pedal lever 100 and control member 108 may freely swing through the slight angle necessary for operation of the valve mechanism of the motor by the bumper 120.

A pressure cylinder 140 is provided with a laterally extending bracket 141 fixed to the pedal lever 100 as at 142. A piston 143 (FIGURE 3) is slidable in the cylinder 140 and is provided with a piston rod 144 connected to an axially adjustable stem 145 the upper end of which extends laterally as at 146 through the walls 109 of the control member 108. Springs 148 in the cylinder 140 bias the piston 143 downwardly. The lower chamber 149 of the cylinder 140 communicates with a passage 150 in a boss 151 formed on the cylinder 140, and the passage 150 is connected by a suitable means (not shown) with the pressure source 67. When pressure is present in the source, the piston 143 is maintained in its upper limit of movement under which conditions a shoulder 152 on the piston rod 144 engages the cap 153 on the upper end of the cylinder 140.

*Operation*

The parts normally occupy the positions shown in FIGURE 1. The pressure valve 63 is closed and the air valve 76 is open, thus connecting the valve chamber 69 to the atmosphere through the vent 78. Since the motor chamber 55 communicates with the valve chamber 69, pressure will be balanced on opposite sides of the pressure responsive unit 28.

One of the forces of the spring 114 is utilized to bias the bumper 120 into engagement with the push rod 85. With the parts in their normal positions, the brake pedal 100 is movable through an appreciable distance without moving the pin 136, due to the play between this pin and the edge of the slot 127 to the left thereof. Thus the pedal 100 may be operated to operate the valve mechanism to energize the motor for a full power operation of the brakes without moving the pin 136.

Initial movement of the pedal lever 100 moves the push rod 85 to the left and initial movement of such member engages the left face (FIGURE 1) of the head 86 with the valve 76, thus disconnecting the chamber 69 from the atmosphere. Very slight further movement of the brake pedal will axially move the valve body 74 to crack the valve 63, thus admitting superatmospheric pressure from the source 67 around the valve 63, into the chamber 69 and thus through port 70 into the motor chamber 55. The pressure responsive unit 28 will be moved to the left to similarly move the master cylinder plunger 15 to generate pressure in the chamber 16 to apply the brakes. Since this operation takes place without movement of the pin 136, the yoke 135, rod 45 and member 36 will remain stationary.

Initial energization of the motor takes place as stated, with pressure present in the valve chamber 69. This pressure acts against the head 86 to slightly oppose valve operating movement of the pedal lever 100, thus providing the brake pedal with "feel" proportional to the degree of energization of the motor. In the initial motor operating stage, the motor chamber 55 expands relatively easily since there is no substantial resistance to movement of the master cylinder plunger. The pressure in the chamber 55 thus does not initially increase to a substantial extent.

When the brake shoes engage the drums, however, resistance to movement of the plunger 15 and hence of the pressure responsive unit 28 increases and pressure will be very rapidly built up in the motor chamber 55. This pressure will be duplicated in the valve chamber 69 and approximately at the point where initial engagement of the brake shoes with the drums takes place, the spring 88 will yield and the spring seat 87 will back off into engagement with the adjacent cushioned shoulder of the push rod 85. Pressure acting against the left-hand face of the diaphragm 82 then will be added to pressure acting against the head 86 to more substantially resist movement of the brake pedal. This reaction against the brake pedal will again be proportional to pressure in the motor chamber 55, but at a higher rate and the "feel" of the brake pedal apprises the operator of the degree of brake application. Where maximum braking is desired, the brake pedal will be depressed until pressure in the motor chamber 55 equals pressure in the source. At any intermediate point, the operator may back off very slightly on the brake pedal, thus allowing the spring 77 to seat the pressure valve 63 while the air valve 76 remains seated. The valves are then in lap position. If a slackening off of brake application is desired, the brake pedal will be backed off very slightly to crack the air valve 76 and thus reduce pressure in the motor chamber 55.

The motor is so designed as to capacity to provide the maximum desired degree of brake application without any assistance on the part of the operator. Under normal conditions therefore anything from a slight to a full brake application may be obtained by very slight movement of the brake pedal. The brakes are released by releasing the brake pedal, the spring 77 returning the valve 63 to closed position while the spring 90 returns the push rod 85 to normal position, opening the air valve 76 and venting the motor chamber 55 to the atmosphere. The return spring 54 of the motor will return the pressure responsive unit to its normal position, with the bumper 38 engaging the manually operable member 36.

In its normal operation therefore the present invention provides for the almost effortless full application of the brakes with extremely slight movement of the brake pedal. For normal operation, therefore, the brake pedal may be arranged relatively low so that for right-foot braking the right toe portion of the operator's foot may slide sidewise from the accelerator pedal to the brake pedal without lifting the foot. The lever mechanism 46 in combination with the arrangement of parts of the motor provides for such operation, but at the same time functions to provide for greater pedal travel and greater leverage for the manual operation of the brakes in the event of a failure of power in the motor. The pedal lever parts, when released, occupy the positions shown in FIGURE 1 from which position the lower end of the pedal lever 100 swings very slightly forwardly for a brake application. So long as pressure is available in the source, such pressure will be maintained in the cylinder chamber 149 (FIGURE 3). Such pressure maintains the piston 143 at its uppermost limit of movement with the shoulder 152 with engagement with the cap 153 while the springs 148 will be held under compression. In the event of a failure of pressure in the source, a pressure in the chamber 149 will drop and the springs 148 will move the piston 143 downwardly to the position shown in FIGURE 3. The control member 108 is longitudinally slidable along the pedal lever 100 and the pin 136 is normally arranged in the lower end of the slot 127. When pressure fails, movement of the piston 143 downwardly transmits to the laterally extending end 146 of the rod 145 a downward force which pulls the control member 108 downwardly. The slot 127 thereupon acts as a cam to cause the lever mechanism as a whole to swing rearwardly at its lower end to the position shown in solid lines in FIGURE 2. The spring end 116 assists in this movement and the pin 136 will come to rest in the recessed portion 129 of the slot 127, after having passed over the curved portion 130, which serves to assure the retention of the pin 136 in the slot portion 129. The bumper 120 not only will be swung outwardly a substantial distance from the valve push rod 125 but will be arranged substantially below such rod.

The brake pedal will now be in position to directly operate the brakes without power, the brake lever being provided with relatively high leverage with ample travel for foot application of the brakes. If it now becomes necessary to apply the brakes, the operator will depress the brake pedal, and the control member 108, moving with the pedal lever 100, will deliver power directly through the pin 136 to the rod 45 and manually operable member 36, and this movement will be transmitted through the bumper 38 to the pressure responsive member 28, and through the sleeve 40 to the master cylinder plunger 15. Such operation will be the same as for conventional non-power brakes. In a typical installation, the pedal ratio will be 5.5:1.

To provide for the greatest possible pedal travel, if necessary, the space between the connecting portions 110 and 111 of the control member are so positioned during manual operation as to allow for the reception therebetween of the valve push rod 85, as suggested in FIGURE 2. In the same typical installation, the pedal stroke is in excess of six inches. Thus pedal travel and ratio are such as to provide for the manual application of the brakes in accordance with a conventional non-power operation.

If, with the lever mechanism in position for manual operation of the brakes (FIGURE 2), pressure in the source should be restored, the parts will automatically reassume their proper positions for power operation. The restoration of pressure in the cylinder chamber 149 (FIGURE 3) will force the piston 143 upwardly and force will be transmitted to the control member 108 to slide the control member 108 upwardly. The pin 136 will ride relatively over the curved slot portion 130 and thence downwardly to its normal position in the lower end of the slots 127. Thus the assumption of the positions of the parts of the pedal lever mechanism for either power or foot operation will take place automatically in accordance with whether pressure is available in the pressure source which operates the motor 10.

The specific form of the lever mechanism and control member 108 is of no importance in the copending application referred to above, but is of great importance in the present application. In the present case the means for shifting the pedal, moving the valve operating bumper away from the valve operating member 85, establishing a connection between the cam slot portions 129 and pin 136 and the means (FIGURE 3) for controlling the movement of the control member 108 are all carried by the pedal lever 100. There is thus provided in the pedal lever mechanism a self-contained unit, in combination with the motor structure, for accomplishing all of the desired results described above.

From the foregoing it will be apparent that the present invention is highly practicable for providing for the full power operation of the brakes with a low pedal which partakes of very slight movement, but wherein the mechanism is capable of directly delivering foot power with a substantial leverage ratio to the master cylinder plunger in the event of a failure in the pressure source for the motor. The invention is of such nature that no manual brake forces are applied so long as source pressure is present, and when pressure in the source fails, it is not even necessary for the valve mechanism for the motor to be operated. In power operation reaction forces according to motor pressures are delivered to the brake pedal, whereas in pedal operation, with no pressure present in the source, the brake pedal "feel" is the direct brake pressure reaction transmitted to the brake pedal.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a motor having a casing and a pressure responsive unit forming therewith a pressure chamber, a normally stationary manually operable member movable to actuate said pressure responsive unit, a valve mechanism controlling communication between said pressure chamber and a pressure source and having an operating member, a lever mechanism normally engaging said operating member and having a normal position from which it is movable to move such member and operate said valve mechanism to connect said pressure chamber to said source, said lever mechanism normally having lost motion connection with said manually operable member within the limits of which lost motion said valve mechanism is operable without moving said manually operable member, and means automatically operative upon a failure of pressure in said source for moving said lever to a different normal position and taking up said lost motion connection and for establishing mechanical connection between said lever mechanism and said manually operable member for actuating the latter without moving said operating member.

2. A fluid pressure motor mechanism comprising a motor having a casing and a pressure responsive unit forming therewith a pressure chamber, a normally stationary manually operable member movable to actuate said pressure responsive unit, a valve mechanism controlling communication between said pressure chamber and a pressure source and having an operating member, a lever mechanism normally engaging said operating member and having a normal position from which it is movable to move such member and operate said valve mechanism to connect said pressure chamber to said source, said lever mechanism normally being freely movable relative to said manually operable member to move said valve mechanism without moving said manually operable member, said lever mechanism comprising a pedal lever, and means wholly carried by said pedal lever and responsive to a failure of pressure in said source for moving said lever to a different normal position from which it is movable to operate said manually operable member without moving said operating member.

3. A fluid motor mechanism according to claim 2 wherein said means comprises a control device movable relative to said pedal lever, means responsive to pressure in said source for maintaining said control device in a normal position for moving said operating member without moving said manually operable member, and spring means operative upon a failure of power in said source for moving said control device to another position to swing said pedal lever to said different normal position and for establishing mechanical connection between said pedal lever and said manually operable member.

4. A mechanism according to claim 3 wherein said means responsive to a failure of power in said source comprises a cylinder having a pressure responsive element therein connected to said control device, said spring means being arranged in said cylinder and engaging said pressure responsive element to tend to move it in opposition to pressure in said cylinder derived from said source.

5. A fluid pressure motor mechanism comprising a motor having a casing and a pressure responsive unit forming therewith a pressure chamber, a normally stationary manually operable member movable to actuate said pressure responsive unit and arranged coaxial therewith, a valve mechanism controlling communication between said pressure chamber and a pressure source and having an operating member, a lever mechanism mounted to turn as a unit about a pivot axis closer to said manually operable member than to said operating member and having a normal position in which it engages said operating member, said lever mechanism normally having free movement with respect to said manually operable member for the operation of said lever mechanism from said normal position for moving said operating member, and means wholly carried by and forming a part of said lever mechanism and operable upon a failure of pressure in said source for moving said lever mechanism to a different normal position in which it is substantially spaced from said operating member and mechanically connected to said manually operable member whereby, upon operation of said lever mechanism said manually operable member will be moved to move said pressure responsive unit without moving said operating member.

6. A mechanism according to claim 5 wherein said lever mechanism comprises a pedal lever, said means comprising a cam device connected to said lever for movement relative thereto, means responsive to pressure in said source for holding said cam device in a normal position, and spring means operative upon a failure of pressure in said source for moving said cam device to another position to swing said pedal lever to said different normal position.

7. A mechanism according to claim 6 wherein said means responsive to pressure in said source comprises a cylinder having one end connected to said source, a pressure responsive element in said cylinder connected to said cam device, said spring means being arranged in the other end of said cylinder and engaging said pressure responsive element to tend to move it in opposition to pressure in said one end of said cylinder whereby, when such pressure fails, said pressure responsive element will move said cam device to said other position.

8. A mechanism according to claim 5 wherein said lever mechanism comprises a pedal lever, said means comprising a cam device movably mounted on said pedal lever and having a portion establishing said mechanical connection with said manually operable member when said lever mechanism is in said different normal position.

9. A fluid pressure motor mechanism comprising a motor having a casing and a pressure responsive unit forming therewith a pressure chamber, a normally stationary manually operable member coaxial with said pressure responsive unit and movable to actuate the latter, a valve mechanism for controlling communication between said pressure chamber and a pressure source and having an operating member, said valve mechanism having parts coaxial with said operating member and spaced laterally from the axis of said motor, a lever mechanism pivoted to turn on an axis spaced laterally from the axis of said motor at the side thereof opposite the axis of said operating member, said lever mechanism having a normal position in which it engages said operating member and normally having free movement with respect to said manually operable member for operating said valve mechanism without moving said manually operable member, said lever mechanism being pivoted to turn in the plane of the axes of said motor and said operating member and being mounted to turn to a second normal position substantially spaced from said operating member, and means wholly carried by said lever mechanism and responsive to a failure of pressure in said source for swinging said lever to said second normal position and for connecting it to said manually operable member whereby said lever mechanism is movable from said second normal position to operate said manually operable member and move said pressure responsive unit without engaging said operating member.

10. A mechanism according to claim 9 wherein said lever mechanism comprises a pedal lever, said means for swinging said lever mechanism to said second position comprising a control device slidably mounted on said pedal lever and having a cam groove, said manually operable member having a portion mounted in said cam groove and normally providing therewith, when said control device is in a normal position, lost motion within the limits of which said pedal mechanism may move said operating member without moving said portion of said manually operable member, and means responsive to a failure of pressure in said source for moving said control device whereby said cam groove, engaging said portion of said manually operable member, will move said lever mechanism to said second normal position.

11. A mechanism according to claim 10 wherein said means for moving said control device upon a failure of pressure in said source comprises a cylinder having one end connected to said source, a pressure responsive element in said cylinder connected to said control device, and a spring in the other end of said cylinder engaging said pressure responsive element and tending to move it against pressure in said one end of said cylinder.

12. A mechanism according to claim 9 wherein said lever mechanism comprises a pedal lever, said means for swinging said lever mechanism to said second normal position comprising a cam device movable relative to said pedal lever, and means for so moving said cam device upon a failure of pressure in said source.

13. A mechanism according to claim 9 wherein said lever mechanism comprises a pedal lever, said means for moving said lever to said second normal position comprising a cam device carried by said pedal lever and engaging said manually operable member when said lever is in said second normal position, spring means urging said cam device to move relative to said pedal lever whereby engagement of said cam device with said manually operable member will swing said lever mechanism to said second normal position, and means responsive to pressure in said source for normally maintaining said spring means inoperative.

14. A fluid pressure motor mechanism comprising a motor having a casing and a pressure responsive unit forming therewith a pressure chamber, a normally stationary manually operable member movable to actuate said pressure responsive unit and arranged coaxial therewith, a valve mechanism controlling communication between said pressure chamber and a pressure source and having an operating member, a lever mechanism mounted to turn as a unit about a pivot axis closer to said manually operable member than to said operating member and having a normal position in which it engages said operating member, said lever mechanism normally having free movement with respect to said manually operable member for the operation of said lever mechanism from said normal position for moving said operating member, said lever mechanism comprising a pedal lever, a control device mounted for sliding movement along said pedal lever and provided with a cam slot arranged angularly with respect to the adjacent portion of said pedal lever, said manually operable member having a pin arranged in said slot, said control device having a normal position in which it engages said operating member and in which position it has a lost motion connection with said pin whereby said pedal lever is movable to operate said valve mechanism without moving said pin, means subject to pressure in said source for maintaining said control device in said normal position, and spring means opposing said last named means and operative upon a failure of pressure in said source for effecting movement of said control device to a different position during which movement engagement of said cam slot with said pin moves said pedal lever to a different position with said lever mechanism substantially spaced from said operating member and in which different position a portion of said slot is engageable with said pin for the manual operation of said pressure responsive unit through said manually operable member.

15. A mechanism according to claim 14 wherein said means subject to pressure in said source comprises a cylinder having one end connected to said source, and a piston in said cylinder connected to said control device, said spring means being mounted in the other end of said cylinder and engaging said piston to move the latter upon a failure in pressure in said one end of said cylinder.

References Cited in the file of this patent

UNITED STATES PATENTS

| | | |
|---|---|---|
| 2,706,020 | Freers et al. | Apr. 12, 1955 |
| 2,755,891 | Levell et al. | July 24, 1956 |
| 2,766,732 | Schultz | Oct. 16, 1956 |
| 2,910,147 | Fishtahler et al. | Oct. 27, 1959 |
| 2,976,849 | Stelzer | Mar. 28, 1961 |
| 2,980,066 | Stelzer et al. | Apr. 18, 1961 |